United States Patent
Hasegawa et al.

(10) Patent No.: US 11,283,071 B2
(45) Date of Patent: Mar. 22, 2022

(54) CATHODE ACTIVE MATERIAL AND LITHIUM ION SECONDARY BATTERY COMPRISING THE SAME

(71) Applicants: Hajime Hasegawa, Susono (JP); Keisuke Omori, Kariya (JP); Masato Hozumi, Mishima (JP); Masashi Kodama, Hadano (JP); Takumi Tanaka, Susono (JP); Hideki Yoshida, Tokushima (JP); Masato Sonoo, Komatsushima (JP); Yuuki Maeda, Anan (JP)

(72) Inventors: Hajime Hasegawa, Susono (JP); Keisuke Omori, Kariya (JP); Masato Hozumi, Mishima (JP); Masashi Kodama, Hadano (JP); Takumi Tanaka, Susono (JP); Hideki Yoshida, Tokushima (JP); Masato Sonoo, Komatsushima (JP); Yuuki Maeda, Anan (JP)

(73) Assignees: TOYOTA JIDOSHA KABUSHIKI KAISHA, Toyota (JP); Nichia Corporation, Anan (JP)

( * ) Notice: Subject to any disclaimer, the term of this patent is extended or adjusted under 35 U.S.C. 154(b) by 0 days.

(21) Appl. No.: 15/587,859

(22) Filed: May 5, 2017

(65) Prior Publication Data

US 2017/0324091 A1     Nov. 9, 2017

(30) Foreign Application Priority Data

May 9, 2016    (JP) .............................. JP2016-093742

(51) Int. Cl.
    *H01M 4/525*      (2010.01)
    *C01G 53/00*      (2006.01)
    (Continued)

(52) U.S. Cl.
    CPC .......... *H01M 4/525* (2013.01); *C01G 53/006* (2013.01); *C01G 53/50* (2013.01); *H01M 4/505* (2013.01);
    (Continued)

(58) Field of Classification Search
    None
    See application file for complete search history.

(56) References Cited

U.S. PATENT DOCUMENTS

| | | |
|---|---|---|
| 9,130,212 B1 | 9/2015 | Kokado et al. |
| 2006/0083989 A1 | 4/2006 | Suhara et al. |

(Continued)

FOREIGN PATENT DOCUMENTS

| | | |
|---|---|---|
| DE | 112014003191 T5 | 3/2016 |
| EP | 3 100 981 B1 | 9/2018 |

(Continued)

*Primary Examiner* — Basia A Ridley
*Assistant Examiner* — Heng M. Chan
(74) *Attorney, Agent, or Firm* — Sughrue Mion, PLLC

(57) ABSTRACT

A cathode active material with high durability and a lithium ion secondary battery. The cathode active material is a cathode active material represented by a general formula $Li_{(1+a)}Ni_xCo_yMn_zW_tO_2$ ($-0.05 \le a \le 0.2$, $x=1-y-z-t$, $0 \le y < 1$, $0 \le t < 1$, $0 < t \le 0.03$), wherein the cathode active material satisfies the following formula (1):

$$\sigma 1/t1 \le 0.92 \quad (1)$$

where t1 is an element concentration average of insides and grain boundaries of primary particles of a W element, and $\sigma 1$ is an element concentration standard deviation of the insides and grain boundaries of the primary particles of the W element.

4 Claims, 3 Drawing Sheets
(2 of 3 Drawing Sheet(s) Filed in Color)

(51) Int. Cl.
  *H01M 4/505* (2010.01)
  *H01M 10/0525* (2010.01)
  *H01M 10/0562* (2010.01)
  *H01M 4/02* (2006.01)

(52) U.S. Cl.
  CPC ...... *C01P 2004/04* (2013.01); *C01P 2004/61* (2013.01); *C01P 2006/12* (2013.01); *H01M 10/0525* (2013.01); *H01M 10/0562* (2013.01); *H01M 2004/028* (2013.01); *H01M 2300/0068* (2013.01)

(56) References Cited

U.S. PATENT DOCUMENTS

| | | |
|---|---|---|
| 2008/0044736 A1 | 2/2008 | Nakura |
| 2011/0033750 A1 | 2/2011 | Hosokawa et al. |
| 2012/0270107 A1 | 10/2012 | Toya et al. |
| 2013/0089787 A1 | 4/2013 | Nagai |
| 2014/0087263 A1 | 3/2014 | Matsumoto et al. |
| 2014/0205901 A1 | 7/2014 | Nagai et al. |
| 2015/0021518 A1 | 1/2015 | Kokado et al. |
| 2016/0006029 A1 | 1/2016 | Sugaya et al. |
| 2016/0093885 A1 | 3/2016 | Kamata et al. |
| 2016/0164093 A1 | 6/2016 | Inoue et al. |
| 2016/0190551 A1 | 6/2016 | Endo |
| 2016/0322627 A1 | 11/2016 | Yoshida et al. |

FOREIGN PATENT DOCUMENTS

| | | |
|---|---|---|
| JP | 2010-267400 A | 11/2010 |
| JP | 2011-116580 A | 6/2011 |
| JP | 4824349 B2 | 11/2011 |
| JP | 5023912 B2 | 9/2012 |
| JP | 5035712 B2 | 9/2012 |
| JP | 2012-252807 A | 12/2012 |
| JP | 2013-51172 A | 3/2013 |
| JP | 2013-125732 A | 6/2013 |
| JP | 2013-134871 A | 7/2013 |
| JP | 2013-152866 A | 8/2013 |
| JP | 2013-161644 A | 8/2013 |
| JP | 2013-222693 A | 10/2013 |
| JP | 2013-229339 A | 11/2013 |
| JP | 5370515 B2 | 12/2013 |
| JP | 5440225 B2 | 3/2014 |
| JP | 2014-183031 A | 9/2014 |
| JP | 5598726 B2 | 10/2014 |
| JP | 2014-209496 A | 11/2014 |
| JP | 2015-26455 A | 2/2015 |
| JP | 2016-94307 A | 5/2016 |
| JP | 2016-154143 A | 8/2016 |
| WO | 2004/092073 A1 | 10/2004 |
| WO | 2011/161754 A1 | 12/2011 |
| WO | WO-2014181891 A1 * | 11/2014 ............ H01M 4/485 |

* cited by examiner

CATHODE ACTIVE MATERIAL AND LITHIUM ION SECONDARY BATTERY COMPRISING THE SAME

TECHNICAL FIELD

The disclosure relates to a cathode active material and a lithium ion secondary battery comprising the cathode active material.

BACKGROUND

There are many researches focusing on cathode active materials for the improvement of performance of lithium ion secondary batteries.

For example, a lithium secondary battery is disclosed in Patent Literature 1, the battery comprising, for the purpose of increasing power output in a low SOC region and preventing battery performance deterioration resulting from charge-discharge cycles, a cathode comprising a cathode active material which is in the form of secondary particles that are composed of aggregated primary particles of a lithium transition metal oxide with a layered structure, which contains at least one of Ni, Co and Mn, which further contains W, Ca and Mg, and in which the W element is non-uniformly present on the surfaces of the primary particles.

Patent Literature 2 discloses that electrode resistance can be reduced by a cathode active material obtained by mixing a lithium compound and nickel-cobalt-manganese composite hydroxide particles and firing the thus-obtained mixture, the particles being composed of plate-shaped primary particles aggregated in a random direction and containing at least one element selected from the group consisting of Ti, V, Cr, Al, Mg, Zr, Nb, Mo, Hf, Ta and W.

Patent Literature 1: Japanese Patent Application Laid-Open (JP-A) No. 2012-252807
Patent Literature 2: JP-A No. 2011-116580

SUMMARY

Compared to a lithium secondary battery comprising a cathode active material that does not contain a W element, the lithium secondary battery of Patent Literature 1 showed an effect of increasing a capacity retention rate after charge-discharge cycles. However, there is a need for further increase in durability.

The disclosed embodiments were achieved in light of the above circumstance. An object of the disclosed embodiments is to provide a cathode active material with high durability and a lithium ion secondary battery.

It was found that durability is increased by uniformizing the distribution of a W element in a cathode active material containing the W element. The disclosed embodiments were achieved in light of this finding.

In a first embodiment, there is provided a cathode active material represented by a general formula $Li_{(1+a)}Ni_xCo_yMn_zW_tO_2$ ($-0.05 \leq a \leq 0.2$, $x=1-y-z-t$, $0 \leq y < 1$, $0 \leq z < 1$, $0 < t \leq 0.03$), wherein the cathode active material satisfies the following formula (1):

$$\sigma1/t1 \leq 0.92 \quad (1)$$

where t1 is an element concentration average of insides and grain boundaries of primary particles of a W element, and σ1 is an element concentration standard deviation of the insides and grain boundaries of the primary particles of the W element.

The cathode active material may satisfy at least one of the following formulae (2) to (4):

$$\sigma2/t2 \leq 0.10 \quad (2)$$

$$\sigma3/t3 \leq 0.10 \quad (3)$$

$$\sigma4/t4 \leq 0.10 \quad (4)$$

where t2 is an element concentration average of insides and grain boundaries of primary particles of a Ni element; t3 is an element concentration average of insides and grain boundaries of primary particles of a Co element; t4 is an element concentration average of insides and grain boundaries of primary particles of a Mn element; σ2 is an element concentration standard deviation of the insides and grain boundaries of the primary particles of the Ni element; σ3 is an element concentration standard deviation of the insides and grain boundaries of the primary particles of the Co element; and σ4 is an element concentration standard deviation of the insides and grain boundaries of the primary particles of the Mn element.

The cathode active material may satisfy all of the following formulae (5) to (7):

$$\sigma2/t2 \leq 0.07 \quad (5)$$

$$\sigma3/t3 \leq 0.07 \quad (6)$$

$$\sigma4/t4 \leq 0.07 \quad (7)$$

In another embodiment, there is provided a lithium ion secondary battery comprising: a cathode comprising a cathode active material layer comprising the cathode active material, an anode comprising an anode active material layer comprising an anode active material, and an electrolyte layer disposed between the cathode and the anode.

According to the disclosed embodiments, a cathode active material with high durability and a lithium ion secondary battery can be obtained.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
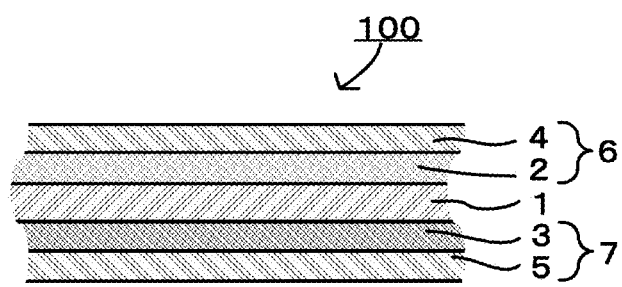
FIG. 1 is a sectional view of a schematic structure of the lithium ion secondary battery of the disclosed embodiments.

In the disclosed embodiments, "lithium ion secondary battery" is a secondary battery that can be charged and discharged by charge transfer associated with lithium ion transfer between a cathode and an anode. Also, the cathode active material of the disclosed embodiments may be used for all-solid-state lithium batteries, especially for a sulfide all-solid-state lithium battery.

Also in this specification, "active material" is a material that can reversibly occlude and release (typically insert and extract) a chemical species that serves as a charge carrier in a secondary battery (i.e., lithium ions in this specification).

Also in this specification, unless otherwise noted, "SOC" is a state of charge of a secondary battery based on a voltage range where the battery is generally used. For example, in the case of a lithium ion secondary battery comprising a lithium transition metal oxide with a layered structure, "SOC" is a state of charge based on a rated capacity measured in the condition of a terminal-to-terminal voltage of from 4.1 V (upper limit voltage) to 3.0 V (lower limit voltage).

1. Cathode Active Material

The cathode active material of the disclosed embodiments is a cathode active material represented by a general formula $Li_{(1+a)}Ni_xCo_yMn_zW_tO_2$ ($-0.05 \leq a \leq 0.2$, $x=1-y-z-t$, $0 \leq y<1$, $0 \leq z<1$, $0<t \leq 0.03$), wherein the cathode active material satisfies the following formula (1):

$$\sigma 1/t1 \leq 0.92 \qquad (1)$$

where $t1$ is an element concentration average of insides and grain boundaries of primary particles of a W element, and $\sigma 1$ is an element concentration standard deviation of the insides and grain boundaries of the primary particles of the W element.

The cathode active material of the disclosed embodiments is in the form of secondary particles that are composed of aggregated primary particles of a lithium transition metal oxide.

The cathode active material of the disclosed embodiments has better durability since the W element is uniformly distributed. This is supposed to be because the W element exerts a high O atom attracting effect uniformly throughout the cathode active material.

<<Distribution of W Element>>

The distribution of the W element present in the cathode active material can be confirmed by, for example, mapping the distribution of the W element in the cathode active material particles (secondary particles) by energy dispersive x-ray spectroscopy (EDX). The positions of the grain boundaries of the primary particles (the surfaces of the primary particles) can be confirmed by, for example, observing sections of the cathode active material particles with a transmission electron microscope (TEM). In this case, TEM-EDX may be used.

The W element contained in the cathode active material may be present throughout in the insides of the primary particles.

The state in which the W element "is present throughout the insides of the primary particles" means that the W element is present (distributed) throughout the cathode active material without noticeable non-uniformity (or the W element may be almost uniformly present (distributed) throughout the cathode active material). The uniform distribution of the W element can be confirmed by, for example, line analysis of the cathode active material particles (secondary particles) by EDX and checking if there is no concentration at the positions corresponding to the grain boundaries.

The uniform distribution of the W element can be also confirmed by mapping the distribution of the W element and checking if there is no concentration at the grain boundaries. An example of the uniform distribution of the W element may be such that the results of the line analysis are almost uniform throughout the insides of the primary particles (for example, throughout the active material particles).

The cathode active material of the disclosed embodiments may contain at least one element selected from the group consisting of Ni, Co and Mn. These elements may be (almost uniformly) present throughout the insides of the primary particles.

In the disclosed embodiments, the value of the element concentration standard deviation σ/the element concentration average t is used as the index of the uniformity of the element.

In the disclosed embodiments, for each target element, the element concentration average t is calculated as follows: at least one point (x point(s)) is randomly selected from both the insides and grain boundaries of the primary particles; for the selected point(s), the element concentration(s) (c1, c2 . . . cx) of the target element when the total amount of Ni, Co, Mn and W is determined as 100 at %, is obtained by TEM-EDX analysis; the average value of the thus-obtained element concentration(s) at the x point(s) of the target element is calculated ($t=(c1+c2+ \ldots +cx)/x$).

Also in the disclosed embodiments, for each target element, the element concentration standard deviation σ is calculated from the above-obtained element concentration(s) at the x position(s) of the target element, using a STDEV.P function in Excel.

In the disclosed embodiments, the composition ratio of the elements constituting the cathode active material has an influence on the size of the element concentration standard deviation c; therefore, the value obtained by dividing the element concentration standard deviation σ by the element concentration average t (that is, σ/t) is used as the index of uniformity.

The content of the W element in the cathode active material is as follows, when the total amount of the Ni, Co, Mn and W contained in the cathode active material is determined as 100 at %: the lower limit of the content is not particularly limited, as long as it is more than 0 at %, and it may be 0.01 at % or more, or 0.05 at % or more; moreover, the upper limit may be 3.0 at % or less, or 2.0 at % or less.

When the content of the W element is too small, a battery performance increasing effect thus obtained (such as an effect of increasing power output in a low SOC region or an effect of reducing reaction resistance) may be insufficient.

Even when the content of the W element is too large, the battery performance increasing effect on a composition that does not contain the W element, may be insufficient or, instead, battery performance may decrease.

From the viewpoint of reducing the resource risk of battery materials, it is also advantageous to set the content of the W element in the above range. The content of the W element can be obtained from the element concentration average, or it can be measured by inductively coupled plasma (ICP) emission spectrometry with reference to JIS K 0116.

<<Method for Producing Cathode Active Material>>

As the method for producing the cathode active material, a method that can produce the cathode active material as a final product, can be appropriately employed. Hereinafter, mainly using an oxide that has a layered structure and contains all of Ni, Co, Mn and W (i.e., a LiNiCoMnW oxide) as an example of the cathode active material, an embodiment of the method for producing the cathode active material will be described in more detail, which is not intended to limit the scope of the technique disclosed herein to this cathode active material.

The method for producing the cathode active material of the disclosed embodiments includes the step of preparing an aqueous solution A containing Ni, Co and Mn (typically an acidic solution, that is, an aqueous solution at a pH of less than 7). This aqueous solution A is typically a composition that does not substantially contain W. The content ratio of the metal elements in the aqueous solution A can be appropriately determined depending on the composition of the target product, that is, the cathode active material. For example, the mole ratio of the Ni, Co and Mn can be almost the same level as the mole ratio of the elements in the cathode active material.

The aqueous solution A may be one kind of aqueous solution containing all of Ni, Co and Mn, or it may be two or more kinds of aqueous solutions different in composition. In general, from the viewpoint of avoiding the complication of the production device or from the viewpoint of ease of production condition control, one kind of aqueous solution containing all of Ni, Co and Mn may be used as the aqueous solution A.

<<Aqueous Solution A>>

The aqueous solution A can be produced by, for example, dissolving predetermined amounts of appropriate Ni, Co and Mn compounds in an aqueous solvent. As the metal compounds, examples include, but are not limited to, salts of the metals (that is, Ni, Co and Mn salts).

The order of adding the metal salts to the aqueous solvent is not particularly limited. The aqueous solution A may be produced by mixing aqueous solutions of the salts. The anions of the metal salts (the Ni, Co and Mn salts) may be selected so that the salts have desired solubilities in water. As the anions, examples include, but are not limited to, sulfuric acid ions, nitric acid ions, chloride ions, carbonic acid ions and hydroxide ions. That is, the metal salts may be the sulfate salts, nitrate salts, hydrochloride salts, carbonate salts, hydroxides, etc., of Ni, Co and Mn. The anions of the metal salts may be all or partly the same or may be different. These salts may be solvates such as hydrates. The concentration of the aqueous solution A may be such a concentration that the total of all the transition metals (Ni, Co, Mn) is in a range of from about 1.0 to 2.6 mol/L. When the concentration of the aqueous solution A is less than 1.0 mol/L, the amount of a crystallized product per reaction vessel is small and results in a decrease in productivity. On the other hand, when the concentration of the aqueous solution A is more than 2.6 mol/L, it is more than the saturation concentration of the aqueous solution A at normal temperature and, therefore, crystals are reprecipitated to decrease the concentration of the solution.

<<Aqueous Solution B (W Aqueous Solution)>>

The method for producing the cathode active material of the disclosed embodiments includes the step of preparing an aqueous solution B containing the W element (hereinafter it may be referred to as "W aqueous solution"). Typically, the W aqueous solution is a composition that does not substantially contain Ni, Co and Mn (it means that these metal elements are not at least intentionally contained in the W aqueous solution, and it may be allowed that they are mixed as inevitable impurities or the like). For example, a W aqueous solution that substantially contains only the W element as a metal element, may be used. The W aqueous solution is produced by dissolving a predetermined amount of a W compound in an alkaline aqueous solution at a pH of 10 or more at 25° C. (hereinafter, pH is a value measured at a solution temperature of 25° C.) such as a sodium hydroxide aqueous solution. As the W compound, examples include, but are not limited to, various kinds of W salts. For example, a salt of tungstic acid (oxo acid comprising W as the central element) may be used. The cations of the W salt can be selected so that the salt is water-soluble. As the cations, examples include, but are not limited to, ammonium ions, sodium ions and potassium ions. As the W salt that may be used, examples include, but are not limited to, ammonium paratungstate and sodium tungstate. The W salt may be a solvate such as a hydrate. The concentration of the W aqueous solution may be in a range of from about 0.01 to 2.1 mol/L on the W element basis.

The aqueous solvent that is used for the production of the aqueous solution A, is typically water. Depending on the solubilities of the metal compounds used, water containing a reagent that can increase the solubilities (such as acid or alkali) may be used.

<<Alkaline Aqueous Solution>>

The method for producing the cathode active material of the disclosed embodiments may further include the step of preparing an alkaline aqueous solution. The alkaline aqueous solution is an aqueous solution of an alkaline agent (a compound having a function of making a solution alkaline) dissolved in an aqueous solvent. As the alkaline agent, an alkali metal hydroxide such as sodium hydroxide or potassium hydroxide may be used. Also, alkaline aqueous solutions different in composition (such as a sodium hydroxide aqueous solution and a potassium hydroxide aqueous solution) may be used. Typically, the alkaline agent is a composition that does not substantially contain Ni, Co, Mn and W (it means that these metal elements are not at least intentionally contained, and it may be allowed that they are mixed as inevitable impurities or the like).

<<Complexing Agent>>

The method for producing the cathode active material of the disclosed embodiments may further include the step of preparing a complexing agent.

As the complexing agent, one that is capable of forming complex ions with the metal elements contained in the aqueous solution A, can be used. For example, an ammonia aqueous solution can be used.

<<Crystallization of Precursor Hydroxide>>

Then, a precursor hydroxide containing Ni, Co, Mn and W is precipitated (crystallized) by simultaneously supplying the aqueous solution A, the aqueous solution B, a solution containing the complexing agent, and an alkaline solution (the aqueous solution A and the aqueous solution B are separately supplied) and thereby mixing them under an alkaline condition (for example, at a pH of from 10 to 13.5).

As the crystallization method, examples include, but are not limited to, the following method: such an alkaline aqueous solution that the initial pH is in a range of from 10 to 13.5 (typically from 10.5 to 13; for example, about 11.3) is put in a reaction vessel, and with keeping the initial pH, the aqueous solution A, the aqueous solution B, the solution containing the complexing agent, and the alkaline solution are simultaneously supplied (the aqueous solution A and the aqueous solution B are separately supplied) at an appropriate speed and stirred to be mixed so that the concentration of the complexing agent is in a range of from 1000 to 15000 ppm.

As the crystallization method, examples also include, but are not limited to, the following method: such an alkaline aqueous solution that the initial pH is in a range of from 10 to 13.5 (typically from 10.5 to 13; for example, about 11.3) and the concentration of the complexing agent is in a range of from 1000 to 15000 ppm, is put in a reaction vessel; the aqueous solution A is supplied to precipitate a hydroxide containing Ni, Co and Mn; then, with keeping the initial pH in a range of from 10 to 13.5 (typically from 10.5 to 13; for example, about 11.3), the aqueous solution A, the aqueous solution B, the solution containing the complexing agent, and the alkaline solution are simultaneously supplied to the reaction vessel (the aqueous solution A, the aqueous solution are separately supplied) at an appropriate speed and stirred to be mixed so that the Ni ion concentration of the reaction solution is in a range of from 10 to 1000 ppm and the concentration of the complexing agent is in a range of from 1000 to 15000 ppm.

Each of the above-mentioned hydroxide particles containing Ni, Co and Mn, becomes the seed of each of the final hydroxide particles containing the Ni, Co, Mn and W. Therefore, the total number of secondary particles of the final hydroxide containing Ni, Co, Mn and W, can be determined from the number of the particles of the thus-obtained hydroxide containing Ni, Co and Mn. In the seed formation process, as the amount of the supplied aqueous solution A increases, there is a tendency that the number of the seeds thus produced increases and the average particle diameter of the secondary particles of the final hydroxide containing Ni, Co, Mn and W decreases. By the seed formation process, lot-to-lot variation can be prevented. After the crystallization, the precursor hydroxide thus precipitated may be water-washed, filtered, dried and then formed into particles with a desired particle diameter.

During the precipitation reaction of the precursor hydroxide (the formation reaction of the hydroxide) is developed, the temperature of the reaction solution may be controlled in a range of from 25° C. to 80° C., or it may be controlled in a range of from 30° C. to 60° C. From the viewpoint of obtaining the precursor hydroxide in which the W element is more uniformly present, the precursor hydroxide precipitation reaction time may be 12 hours or more. From the viewpoint of productivity, it may be 60 hours or less.

For the aqueous solution A, the total mole number of the Ni, Co and Mn contained in the aqueous solution A can be appropriately determined depending on the particle diameter (typically, the average particle diameter) of the target cathode active material. As a tendency, the total mole number may be increased to obtain the cathode active material with a larger particle diameter.

As just described, the precursor hydroxide (typically in a particulate form) that is suitable for the production of the cathode active material in which the W element is uniformly present, can be produced by preparing the aqueous solution A and the aqueous solution B (which is controlled at a pH of 10 or more) separately and then supplying the aqueous solution A, the aqueous solution B, the complexing agent, and the alkaline solution separately and simultaneously at an appropriate speed. Hereinafter, this point will be described in detail.

Tungsten is not precipitated as a tungsten hydroxide under an alkaline condition. It is precipitated in combination with the metal element contained in the aqueous solution A (hereinafter the metal element will be described as nickel) as a tungsten compound (such as $NiWO_4$) and is incorporated in the insides and surfaces of the primary particles composed of the precursor hydroxide.

Therefore, in the case of supplying a mixture of the aqueous solution A and the aqueous solution B to the alkaline solution, due to a high nickel ion concentration around the tungsten, the precipitation rate of the tungsten compound is fast and tungsten segregation is likely to occur in the insides and on the surfaces of the primary particles.

On the other hand, in the case of supplying the aqueous solution A and the aqueous solution B separately to the alkaline solution, a nickel hydroxide is precipitated separately; therefore, the nickel element is not very much present around the tungsten, and the precipitation of the tungsten compound does not occur very much. Then, the precipitated nickel hydroxide reacts with the complexing agent to be gradually re-eluted as nickel complex ions, and the nickel complex ions react with the tungsten to precipitate the tungsten compound. During the precipitation, due to a low concentration of the re-eluted nickel complex ions, the tungsten compound precipitation rate can be low.

For the above reason, it is considered that the tungsten can be more uniformly present by supplying the aqueous solution A and the aqueous solution B separately.

In the production of the above-mentioned seeds, the aqueous solution A and the aqueous solution B can be supplied. In this case, therefore, the number of the seeds is determined depending on not only the mole number supplied by the aqueous solution A but also the precipitation of the tungsten compound. On the other hand, in the case of carrying out the speciation by supplying only the aqueous solution A (without the use of aqueous solution B), the number of the seeds is determined depending on the mole number supplied by the aqueous solution A. Therefore, it is considered that since the seed formation does not rely on the tungsten precipitation, lot-to-lot variation on the number of the seeds can be prevented.

If the pH of the aqueous solution B is less than 10, the pH of the reaction solution is locally low. In such a low pH region, therefore, the precipitated nickel hydroxide may be eluted again. In this case, in such a region where the pH of the reaction solution is locally low, the nickel concentration around the tungsten increases to increase the tungsten compound precipitation rate, and tungsten segregation is likely to occur in the insides and on the surfaces of the primary particles.

For the above reason, it is considered that by controlling the pH of the aqueous solution B to higher than 10, the tungsten compound precipitation rate can be low and, therefore, the tungsten can be uniformly present in the primary particles.

Moreover, it is considered that by controlling the supply rates of the aqueous solution A, the aqueous solution B, the alkaline aqueous solution and the complexing agent so that the precipitation reaction time is 12 hours or more, the precipitation rate of the W compound can be low and, therefore, the W can be more uniformly present.

The method for producing the cathode active material of the disclosed embodiments includes the step of heating the precursor hydroxide under the air atmosphere to obtain a transition metal composite oxide. For example, the heating temperature can be in a range of from 105 to 900° C., and the heating time can be in a range of from 5 to 50 hours.

The method for producing the cathode active material of the disclosed embodiments includes the step of mixing the transition metal composite oxide and a Li compound. As the Li compound, a Li-containing oxide or a compound that can be changed into an oxide by heating (e.g., carbonates, nitrates, sulfates, oxalates, hydroxides, ammonium salts and sodium salt of Li) may be used. As the Li compound, examples include, but are not limited to, lithium carbonate and lithium hydroxide. Such Li compounds can be used alone or in combination of two or more kinds. The transition metal composite oxide and the Li compound may be mixed by any one of wet mixing and dry mixing. From the viewpoint of easiness and cost, they may be mixed by dry mixing. The mixing ratio of the transition metal composite oxide and the Li compound can be determined so that the target mole ratio of the Li, Ni, Co and Mn in the cathode active material can be achieved. For example, the transition metal composite oxide and the Li compound may be mixed so that the mole ratio of the Li, Ni, Co and Mn is the same level as the mole ratio in the above-mentioned cathode active material.

Then, the mixture is fired to produce a lithium transition metal oxide (firing step).

The firing temperature may be in a range of from 650 to 990° C. When the firing temperature is less than 650° C., unreacted Li may increase. When the firing temperature is more than 990° C., the segregation of the W may occur.

The particle diameter of the cathode active material may be controlled by pulverizing the fired product after the firing step and, as needed, filtering the pulverized fired product. In this manner, such a cathode active material can be obtained, that is in the form of secondary particles composed of the aggregated primary particles of the lithium transition metal oxide, and that the W element is uniformly present in the insides and on the surfaces of the primary particles.

The reason why such a cathode active material that the W element is uniformly present in the insides and on the surfaces of the primary particles, is obtained by the above-mentioned production method, is supposed to be due to the contribution of the precursor hydroxide in which the W element is uniformly distributed.

For the cathode active material, the average particle diameter of the secondary particles may be in a range of from 1 to 50 μm, from 1 to 20 μm, or from 3 to 6 μm. This is because poor handleability may be obtained if the average particle diameter of the cathode active material is too small, and a flat cathode active material layer may be difficult to obtain if the average particle diameter of the cathode active material is too large.

In this specification, unless otherwise noted, "average particle diameter" is a median diameter (or 50% volume average particle diameter, hereinafter it may be referred to as "D50") derived from a particle size distribution measured by a laser scattering/diffraction particle size distribution analyzer.

The specific surface area of the cathode active material may be in a range of from 0.25 to 1.9 m$^2$/g.

In general, the average particle diameter of the primary particles constituting the cathode active material may be in a range of from 0.1 to 2.0 μm or from 0.2 to 1.5 μm.

In the disclosed embodiments, the average particle diameter of the primary particles is calculated by a general method. As the method for calculating the average particle diameter of the primary particles, examples include, but are not limited to, the following method: first, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical; such a particle diameter calculation by TEM or SEM observation is carried out on 200 to 300 particles of the same type; and the average of the particles is determined as the average particle diameter of the primary particles.

As described above, the W element distribution state can be confirmed by analyzing the compositions of the insides and grain boundaries of the cathode active material by TEM-EDX analysis (point analysis). The cathode active material in which the W element distribution state is uniform, has excellent durability.

As with the W element, the Ni element, the Co element and the Mn element may be uniformly distributed, so that the cathode active material obtains excellent durability.

As with W element, the distribution states of the Ni element, the Co element and the Mn element can be analyzed by TEM-EDX analysis.

The cathode active material of the disclosed embodiments satisfies the following formula (1):

$$\sigma 1/t1 \leq 0.92 \quad (1)$$

where t1 is the element concentration average of the insides and grain boundaries of the primary particles of the W element, and σ1 is the element concentration standard deviation of the insides and grain boundaries of the primary particles of the W element.

From the viewpoint of increasing the cycle characteristics of the lithium ion secondary battery, the cathode active material of the disclosed embodiments may satisfy at least one of the following formulae (2) to (4):

$$\sigma 2/t2 \leq 0.10 \quad (2)$$

$$\sigma 3/t3 \leq 0.10 \quad (3)$$

$$\sigma 4/t4 \leq 0.10 \quad (4)$$

where t2 is an element concentration average of insides and grain boundaries of primary particles of a Ni element; t3 is an element concentration average of insides and grain boundaries of primary particles of a Co element; t4 is an element concentration average of insides and grain boundaries of primary particles of a Mn element; σ2 is an element concentration standard deviation of the insides and grain boundaries of the primary particles of the Ni element; σ3 is an element concentration standard deviation of the insides and grain boundaries of the primary particles of the Co element; and σ4 is an element concentration standard deviation of the insides and grain boundaries of the primary particles of the Mn element.

Also, the cathode active material of the disclosed embodiments may satisfy all of the following formulae (5) to (7):

$$\sigma 2/t \leq 0.07 \quad (5)$$

$$\sigma 3/t \leq 0.07 \quad (6)$$

$$\sigma 4/t4 \leq 0.07 \quad (7)$$

2. Lithium Ion Secondary Battery

The lithium ion secondary battery of the disclosed embodiments comprises: a cathode comprising a cathode active material layer comprising the cathode active material, an anode comprising an anode active material layer comprising an anode active material, and an electrolyte layer disposed between the cathode and the anode.

FIG. 1 is a view of an example of the lithium ion secondary battery of the disclosed embodiments, and it is also a schematic sectional view of the lithium ion secondary battery cut in the laminating direction. The lithium ion secondary battery of the disclosed embodiments is not limited to this example.

A lithium ion secondary battery 100 comprises: a cathode comprising a cathode active material layer 2 and a cathode current collector 4, an anode 7 comprising an anode active material layer 3 and an anode current collector 5, and an electrolyte layer 1 disposed between the cathode 6 and the anode 7.

Hereinafter, the cathode, anode and electrolyte layer used for the lithium ion secondary battery of the disclosed embodiments will be described in more detail. Moreover, a separator and a battery casing, both of which may be used for the lithium ion secondary battery of the disclosed embodiments, will be described.

The cathode comprises the cathode active material layer comprising the cathode active material of the disclosed embodiments. The cathode used in the disclosed embodiments generally comprises the cathode active material layer, the cathode current collector and a cathode lead connected to the cathode current collector.

As needed, the cathode active material layer may comprise an electroconductive material, a binder, etc.

The electroconductive material is not particularly limited, as long as it can increase the electroconductivity of the cathode active material layer. As the electroconductive material, examples include, but are not limited to, carbon black such as Acetylene Black and Ketjen Black, carbon nanotubes (CNT) and carbon nanofibers (CNF). The content ratio of the electroconductive material in the cathode active material layer varies depending on the type of the electroconductive material. When the total mass of the cathode active material layer is determined as 100 mass %, it is generally in a range of from 1 to 30 mass %.

As the binder, examples include, but are not limited to, polyvinylidene fluoride (PVdF), polytetrafluoroethylene (PTFE), butylene rubber (BR) and styrene-butadiene rubber (SBR). The content ratio of the binder in the cathode active material layer may be such a content ratio that can fix the cathode active material, etc., and it may be small. When the total mass of the cathode active material layer is determined as 100 mass %, the content ratio of the binder is generally in a range of from 0.5 to 10 mass %.

The thickness of the cathode active material layer varies depending on the intended application, etc., of a battery. It may be in a range of from 10 to 250 µm, from 20 to 200 µm, or from 30 to 150 µm.

The cathode current collector functions to collect current from the cathode active material layer. As the material for the cathode current collector, examples include, but are not limited to, aluminum, SUS, nickel, chromium, gold, zinc, iron and titanium. As the form of the cathode current collector, examples include, but are not limited to, a foil form, a plate form and a mesh form.

The method for producing the cathode is not particularly limited. As the method, examples include, but are not limited to, the following method: the cathode active material is dispersed in a dispersion medium to prepare a slurry, and the slurry is applied onto the cathode current collector, dried and roll-pressed, thereby producing the cathode.

The dispersion medium is not particularly limited. As the dispersion medium, examples include, but are not limited to, butyl acetate, heptane and N-methyl-2-pyrrolidone.

As the slurry applying method, examples include, but are not limited to, a doctor blade method, a metal mask printing method, an electrostatic coating method, a dip coating method, a spray coating method, a roller coating method, a gravure coating method, and a screen printing method.

After the cathode active material layer is formed, the cathode active material layer may be pressed to increase current density.

The anode comprises the anode active material layer comprising the anode active material. The anode used in the disclosed embodiments generally comprises the anode active material layer, the anode current collector and an anode lead connected to the anode current collector.

The anode active material is not particularly limited, as long as it can occlude/release lithium ions. As the anode active material, examples include, but are not limited to, a lithium metal, a lithium alloy, a lithium element-containing metal oxide, a lithium element-containing metal sulfide, a lithium element-containing metal nitride, a carbonaceous material such as graphite or hard carbon, and Si. Of them, the anode active material may be graphite.

As the lithium alloy, examples include, but are not limited to, a lithium-aluminum alloy, a lithium-tin alloy, a lithium-lead alloy, and a lithium-silicon alloy.

As the lithium element-containing metal oxide, examples include, but are not limited to, a lithium-titanium oxide such as $Li_4Ti_5O_{12}$. As the lithium element-containing metal nitride, examples include, but are not limited to, a lithium-cobalt nitride, a lithium-iron nitride and a lithium-manganese nitride. Also, a lithium metal coated with a solid electrolyte can be used.

As needed, the anode active material layer may comprise an electroconductive material, a binder, etc.

The details of the electroconductive material and the binder are the same as the above-mentioned electroconductive material and binder of the cathode active material layer.

The thickness of the anode active material layer is not particularly limited. For example, it may be in a range of from 10 to 100 µm or from 10 to 50 µm.

The anode current collector functions to collect current from the anode active material layer. As the material for the anode current collector, examples include, but are not limited to, SUS, Cu, Ni, Fe, Ti, Co and Zn. As the form of the anode current collector, examples include, but are not limited to, those mentioned above as the form of the cathode current collector.

The method for forming the anode is not particularly limited, as long as the anode is obtained by the method. After the anode active material layer is formed, the anode active material layer may be pressed to increase electrode density.

The electrolyte layer used in the disclosed embodiments is disposed between the cathode and the anode. It functions to exchange lithium ions between the cathode and the anode.

As the electrolyte layer, examples include, but are not limited to, a liquid electrolyte, a gel electrolyte and a solid electrolyte. Of them, the electrolyte layer may be a solid electrolyte. These electrolytes may be used alone or in combination of two or more kinds.

As the liquid electrolyte, examples include, but are not limited to, a non-aqueous liquid electrolyte.

As the non-aqueous liquid electrolyte, one containing a lithium salt and a non-aqueous solvent is generally used.

As the lithium salt, examples include, but are not limited to, inorganic lithium salts such as $LiPF_6$, $LiBF_4$, $LiClO_4$ and $LiAsF_6$, and organic lithium salts such as $LiCF_3SO_3$, $LiN(SO_2CF_3)_2$(Li-TFSI), $LiN(SO_2C_2F_5)_2$ and $LiC(SO_2CF_3)_3$.

As the non-aqueous solvent, examples include, but are not limited to, ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof. The concentration of the lithium salt in the non-aqueous liquid electrolyte is in a range of from 0.5 to 3 mol/L, for example.

The gel electrolyte is generally a non-aqueous liquid electrolyte gelled by addition of a polymer.

More specifically, the gel electrolyte is obtained by gelling the non-aqueous liquid electrolyte by addition of a polymer such as polyethylene oxide, polypropylene oxide, polyacrylonitrile, polyvinylidene fluoride (PVdF), polyurethane, polyacrylate or cellulose.

As the solid electrolyte, examples include, but are not limited to, a crystalline oxide or oxynitride, a sulfide-based solid electrolyte, an oxide-based solid electrolyte and a polymer electrolyte.

As the crystalline oxide or oxynitride, examples include, but are not limited to, LiI, Li$_3$N, Li$_5$La$_3$Ta$_2$O$_{12}$, Li$_7$La$_3$Zr$_2$O$_{12}$, Li$_6$BaLa$_2$Ta$_2$O$_{12}$, Li$_3$PO$_{(4-3/2w)}$N$_w$ (w<1) and Li$_{3.6}$Si$_{0.6}$P$_{0.4}$O$_4$.

As the sulfide-based solid electrolyte, examples include, but are not limited to, LiI—Li$_2$S—P$_2$O$_5$, LiI—Li$_3$PO$_4$—P$_2$S$_5$, Li$_2$S—P$_2$S$_5$, Li$_2$S—P$_2$S$_3$, Li$_2$S—P$_2$S$_3$—P$_2$S$_5$, Li$_2$S—SiS$_2$, Li$_2$S—Si$_2$S, Li$_2$S—B$_2$S$_3$, Li$_2$S—GeS$_2$, LiI—Li$_2$S—P$_2$S$_5$, LiI—LiBr—Li$_2$S—P$_2$S$_5$, LiI—Li$_2$S—SiS$_2$—P$_2$S$_5$, Li$_2$S—SiS$_2$—Li$_4$SiO$_4$, Li$_2$S—SiS$_2$—Li$_3$PO$_4$, Li$_3$PS$_4$—Li$_4$GeS$_4$, Li$_{3.4}$P$_{0.6}$Si$_{0.4}$S$_4$, Li$_{3.25}$P$_{0.25}$Ge$_{0.76}$S$_4$ and Li$_{4-x}$Ge$_{1-x}$P$_x$S$_4$.

As the oxide-based solid electrolyte, examples include, but are not limited to, Li$_2$O—B$_2$O$_3$—P$_2$O$_5$, Li$_2$O—SiO$_2$, LiPON (lithium phosphate oxynitride), Li$_{1.3}$Al$_{0.3}$Ti$_{0.7}$(PO$_4$)$_3$, La$_{0.51}$Li$_{0.34}$TiO$_{0.74}$, Li$_3$PO$_4$, Li$_2$SiO$_2$ and Li$_2$SiO$_4$.

The polymer electrolyte generally contains a lithium salt and a polymer.

As the lithium salt, examples include, but are not limited to, the above-mentioned inorganic lithium salts and organic lithium salts. The polymer is not particularly limited, as long as it is capable of forming a complex with a lithium salt. As the lithium salt, examples include, but are not limited to, polyethylene oxide.

The lithium ion secondary battery of the disclosed embodiments may comprise a separator. The separator is disposed between the cathode and the anode, and it generally functions to prevent contact between the cathode active material layer and the anode active material layer and to retain the electrolyte. As the material for the separator, examples include, but are not limited to, resins such as polyethylene (PE), polypropylene (PP), polyester, cellulose and polyamide. Of them, the material for the separator may be polyethylene or polypropylene.

The separator may have a single-layered structure or a multi-layered structure. As the separator with a multi-layered structure, examples include, but are not limited to, a separator with a two-layered structure such as PE/PP, and a separator with a three-layered structure such as PP/PE/PP or PE/PP/PE.

In the disclosed embodiments, the separator may be a non-woven fabric such as a resin non-woven fabric or a glass fiber non-woven fabric. The thickness of the separator is not particularly limited, and it is the same as the thickness of a separator that is used for general lithium ion secondary batteries.

The separator may be impregnated with an electrolyte such as the above-mentioned liquid electrolyte.

The lithium ion secondary battery of the disclosed embodiments may comprise a battery casing for housing the cathode, the electrolyte layer, the anode, etc. As the form of the battery casing, examples include, but are not limited to, a coin form, a flat plate form, a cylindrical form and a laminate form.

EXAMPLES

Example 1

[Preparation of Cathode Active Material]

Predetermined amounts of nickel sulfate (as a Ni compound), cobalt sulfate (as a Co compound) and manganese sulfate (as a Mn compound) were dissolved in water to prepare such an aqueous solution A that the total mole number of the metal elements was 474 mole.

Next, 4.7 mole of ammonium paratungstate was dissolved in a sodium hydroxide solution to prepare an aqueous solution B at a pH of 12.3.

As an alkaline aqueous solution, a sodium hydroxide solution was prepared.

As a solution containing a complexing agent, an ammonia aqueous solution was prepared.

A reaction container was filled with nitrogen gas to replace the atmosphere inside the container by nitrogen.

Then, 40 L of water was put in the reaction container. The sodium hydroxide solution was added thereto so that the mixture was at a pH of 12.5. Then, 4 mole of the aqueous solution A was added thereto to precipitate a hydroxide containing Ni, Co and Mn.

Then, under an alkaline condition (pH 11.3), the rest of the aqueous solution A, the aqueous solution B, the alkaline aqueous solution and the ammonia aqueous solution were separately and simultaneously supplied for 18 hours so that the nickel concentration was about 300 ppm and the ammonium concentration was 10000 ppm, while stirring and mixing the aqueous solutions, thereby precipitating (crystallizing) a precursor hydroxide containing Ni, Co, Mn and W.

After the crystallization, the precipitated precursor hydroxide was water-washed, filtered and then dried.

During the precipitation reaction of the precursor hydroxide, the temperature of the reaction solution was controlled at 50° C.

The precursor hydroxide was heated at 300° C. under the air atmosphere for 20 hours, thereby obtaining a transition metal composite oxide.

Then, a predetermined amount of the transition metal composite oxide and a predetermined amount of lithium carbonate (as a Li compound) were subjected to dry mixing.

The thus-obtained mixture was fired to produce a lithium transition metal oxide. The firing temperature was 930° C. The firing time was 15 hours.

In the above-described manner, as a cathode active material, such a cathode active material (Li$_{1.14}$Ni$_{0.332}$Co$_{0.330}$Mn$_{0.328}$W$_{0.010}$O$_2$) that the W element distribution state obtained by TEM-EDX mapping was uniform (the state in which no W concentration was seen in the insides or at the grain boundaries of the primary particles of the active material) was prepared.

Figure 2:
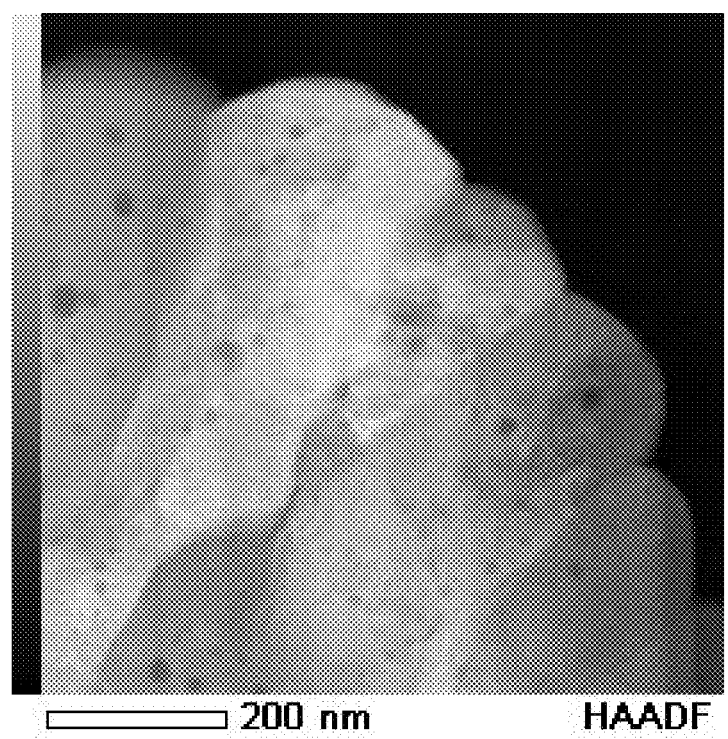
FIG. 2 is a HAADF image of Example 1.
Figure 3:
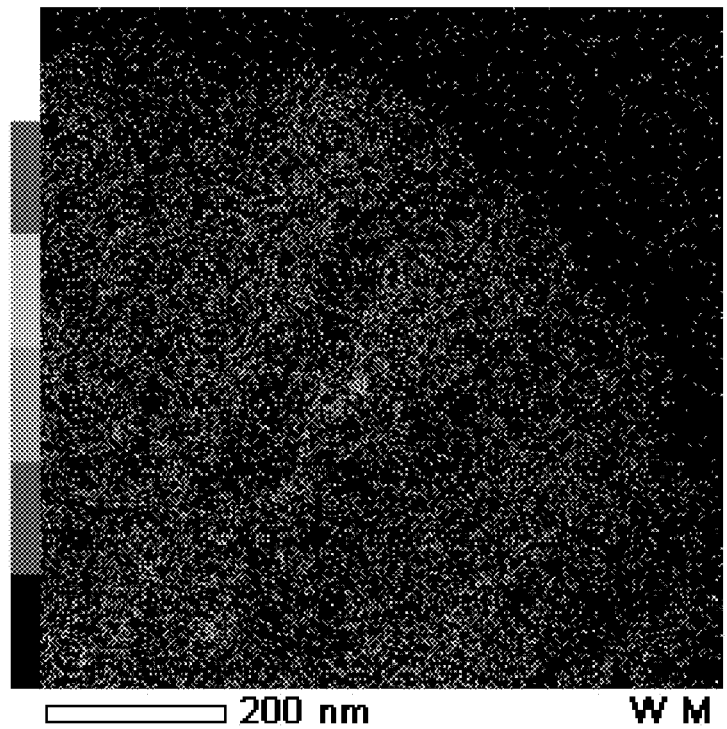
FIG. 3 is a TEM-EDX image of Example 1.

FIG. 2 is a high-angle annular dark-field scanning transmission electron microscopy image or HAADF-STEM image (hereinafter simply referred to as HAADF image) of the cathode active material of Example 1. FIG. 3 is a TEM-EDX image of the cathode active material of Example 1. Table 1 shows the element composition ratios obtained by TEM-EDX analysis of the cathode active material of Example 1.

Figure 4:
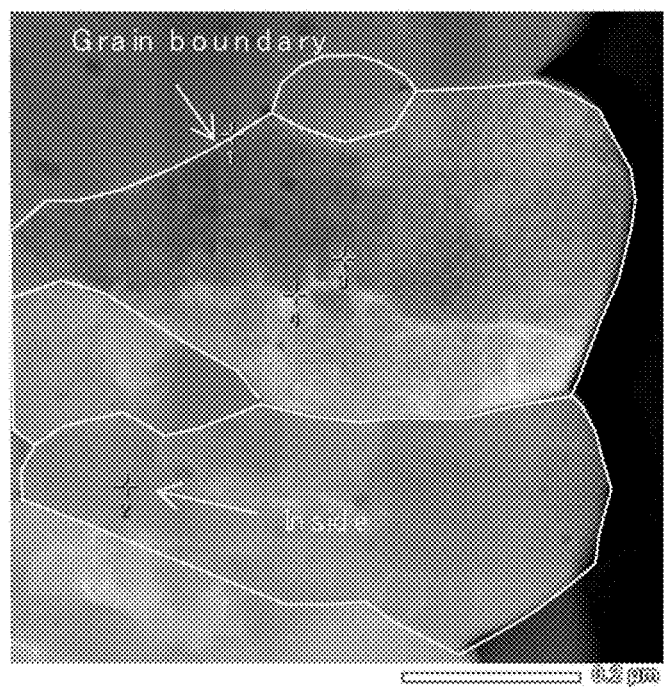
FIG. 4 is a view of an example of the grain boundaries and insides of cathode active material particles in a HAADF image.

In Tables 1 to 6, the numbers shown in the cells of a column on the left of the column "Position" are sample numbers of arbitrary points subjected to the TEM-EDX analysis. Also in Tables 1 to 6, "Grain boundary" and "Inside" shown in the cells of the column "Position" were each determined by, as shown in FIG. 4, looking at the HAADF image and determining whether the position subjected to the TEM-EDX analysis was the grain boundary or inside of the primary particle.

TABLE 1

|  | Position |  | Ni (at %) | Co (at %) | Mn (at %) | W (at %) |
|---|---|---|---|---|---|---|
| Example 1 | 1 | Grain boundary | 31 | 35 | 35 | 0.0 |
|  | 2 | Grain boundary | 31 | 35 | 33 | 0.6 |
|  | 3 | Grain boundary | 31 | 33 | 35 | 1.3 |
|  | 4 | Inside | 30 | 30 | 38 | 1.7 |
|  | 5 | Inside | 28 | 35 | 36 | 0.6 |
|  | 6 | Grain boundary | 34 | 31 | 34 | 1.4 |
|  | 7 | Grain boundary | 30 | 34 | 34 | 2.3 |
|  | 8 | Inside | 34 | 33 | 32 | 1.4 |
|  | 9 | Grain boundary | 34 | 32 | 34 | 0.2 |
|  | 10 | Grain boundary | 28 | 36 | 35 | 1.1 |
|  | 11 | Inside | 34 | 34 | 32 | 0.6 |
|  | 12 | Inside | 29 | 30 | 39 | 1.7 |
|  | Element concentration standard deviation σ |  | 2.2 | 2.0 | 2.1 | 0.65 |
|  | Element concentration average t (%) |  | 33.2 | 33.0 | 32.8 | 1.02 |
|  | σ/t |  | 0.066 | 0.061 | 0.065 | 0.64 |

[Production of Cathode Active Material Coating]

Using a tumbling/fluidizing coating device (manufactured by Powrex Corporation), the cathode active material with the uniform W element distribution was coated with a sol-gel solution of $LiNbO_3$ in the air environment. Then, the coated cathode active material was fired in the air atmosphere.

[Production of Cathode Active Material Layer]

Butyl butyrate and a 5 wt % butyl butyrate solution of a PVdF-based binder (manufactured by Kureha Corporation) were put in a PP container. In addition, the coated cathode active material and a sulfide-based solid electrolyte (a $Li_2S$—$P_2S_5$-based glass ceramics containing LiI and having an average particle diameter of 0.8 μm) were added thereto so that they were at a ratio of 7:3 (vol %). As an electroconductive agent, VGCF™ (manufactured by Showa Denko K. K.) was added thereto. The mixture was stirred by an ultrasonic disperser ("UH-50" manufactured by SMT Co., Ltd.) for 30 seconds.

Next, the container was shaken by a shaker ("TTM-1" manufactured by Sibata Scientific Technology Ltd.) for three minutes. Moreover, the mixture was stirred by the ultrasonic disperser for 30 seconds.

Then, the thus-obtained mixture was applied onto a carbon-coated Al foil ("SDX" manufactured by Showa Denko K. K.) by the blade method using an applicator, thereby obtaining a cathode active material layer.

The cathode active material layer was dried naturally and then dried on a hot plate at 100° C. for 30 minutes.

[Production of Anode Active Material Layer]

Butyl butyrate and a 5 wt % butyl butyrate solution of a PVdF-based binder (manufactured by Kureha Corporation) were put in a PP container. In addition, as an anode active material, a natural graphite-based carbon having an average particle diameter of 10 μm (manufactured by Mitsubishi Chemical Corporation) and a $Li_2S$—$P_2S_5$-based glass ceramics having an average particle diameter of 0.8 μm and containing LiI as a sulfide-based solid electrolyte, were added thereto. The mixture was stirred by the ultrasonic disperser ("UH-50" manufactured by SMT Co., Ltd.) for 30 seconds. Next, the container was shaken by the shaker ("TTM-1" manufactured by Sibata Scientific Technology Ltd.) for three minutes. Moreover, the mixture was subjected to three cycles of ultrasonic dispersion for 30 seconds and shaking for three minutes.

The mixture was applied onto a Cu foil by the blade method using an applicator, thereby obtaining an anode active material layer.

The anode active material layer was dried naturally and then dried on a hot plate at 100° C. for 30 minutes.

[Production of Solid Electrolyte Layer]

Heptane and a 5 wt % heptane solution of a BR-based binder (manufactured by JSR) were put in a PP container. In addition, a $Li_2S$—$P_2S_5$-based glass ceramics having an average particle diameter of 2.5 μm and containing LiI as a sulfide-based solid electrolyte, was added thereto. The mixture was stirred by the ultrasonic disperser ("UH-50" manufactured by SMT Co., Ltd.) for 30 seconds. Next, the container was shaken by the shaker ("TTM-1" manufactured by Sibata Scientific Technology Ltd.) for 30 minutes.

The mixture was applied onto an Al foil by the blade method using an applicator, thereby obtaining an electrolyte layer.

The electrolyte layer was dried naturally and then dried on a hot plate at 100° C. for 30 minutes.

[Production of Battery]

The electrolyte layer was put in a 1 $cm^2$ mold and pressed at 1 ton/$cm^2$ (≈98 MPa) to produce a solid electrolyte layer. The cathode active material layer was placed on the one side of the solid electrolyte layer and pressed at 1 ton/$cm^2$ (≈98 MPa). The carbon-coated Al foil, which is the substrate of the cathode active material layer, was peeled off. Then, the anode active material layer was placed on the other side of the solid electrolyte layer and pressed at 6 ton/$cm^2$ (≈588 MPa), thereby producing a battery.

Example 2

A cathode active material was produced in the same manner as Example 1, except that 2.4 mole of ammonium paratungstate was dissolved in a sodium hydroxide solution to prepare an aqueous solution B at a pH of 12.3.

A battery was produced in the same manner as Example 1, except that the cathode active material ($Li_{1.14}Ni_{0.333}Co_{0.331}Mn_{0.331}W_{0.005}O_2$) was used. Table 2 shows the element composition ratios obtained by TEM-EDX analysis of the cathode active material of Example 2.

TABLE 2

|  | Position |  | Ni (at %) | Co (at %) | Mn (at %) | W (at %) |
|---|---|---|---|---|---|---|
| Example 2 | 1 | Inside | 34 | 34 | 32 | 0.3 |
|  | 2 | Grain boundary | 32 | 36 | 31 | 0.6 |
|  | 3 | Inside | 33 | 33 | 34 | 0.3 |
|  | 4 | Inside | 35 | 31 | 33 | 0.6 |
|  | Element concentration standard deviation σ |  | 1.4 | 2.0 | 1.1 | 0.14 |
|  | Element concentration average t (%) |  | 33.3 | 33.1 | 33.1 | 0.49 |
|  | σ/t |  | 0.041 | 0.061 | 0.034 | 0.30 |

Example 3

A battery was produced in the same manner as Example 1, except that a cathode active material ($Li_{1.16}Ni_{0.334}Co_{0.333}Mn_{0.328}W_{0.005}O_2$) produced in the same manner as Example 2 was used as the cathode active material, and a complex solution of $LiNbO_3$ was used as the cathode active material coating solution.

Table 3 shows the element composition ratios obtained by TEM-EDX analysis of the cathode active material of Example 3.

TABLE 3

| | Position | Ni (at %) | Co (at %) | Mn (at %) | W (at %) |
|---|---|---|---|---|---|
| Example 3 | 1 Inside | 32 | 34 | 34 | 0.3 |
| | 2 Grain boundary | 31 | 36 | 32 | 0.6 |
| | 3 Inside | 33 | 33 | 34 | 0.3 |
| | 4 Inside | 35 | 31 | 33 | 0.6 |
| | 5 Grain boundary | 33 | 32 | 34 | 1.5 |
| | Element concentration standard deviation σ | 1.5 | 2.0 | 0.8 | 0.5 |
| | Element concentration average t (%) | 33.4 | 33.3 | 32.8 | 0.50 |
| | σ/t | 0.045 | 0.059 | 0.025 | 0.92 |

Comparative Example 1

A transition metal composite oxide was obtained in the same condition as Example 1, except that the aqueous solution B was not prepared in the production of the precursor hydroxide. A predetermined amount of the transition metal oxide, a predetermined amount of lithium carbonate, and a predetermined amount of tungsten oxide were subjected to dry mixing.

The thus-obtained mixture was fired to produce a lithium transition metal oxide. The firing temperature was 930° C. The firing time was 15 hours.

A battery was produced in the same manner as Example 1, except that a cathode active material ($Li_{1.15}Ni_{0.334}Co_{0.328}Mn_{0.328}W_{0.010}O_2$) produced in the above-mentioned condition was used as the cathode active material.

Figure 5:
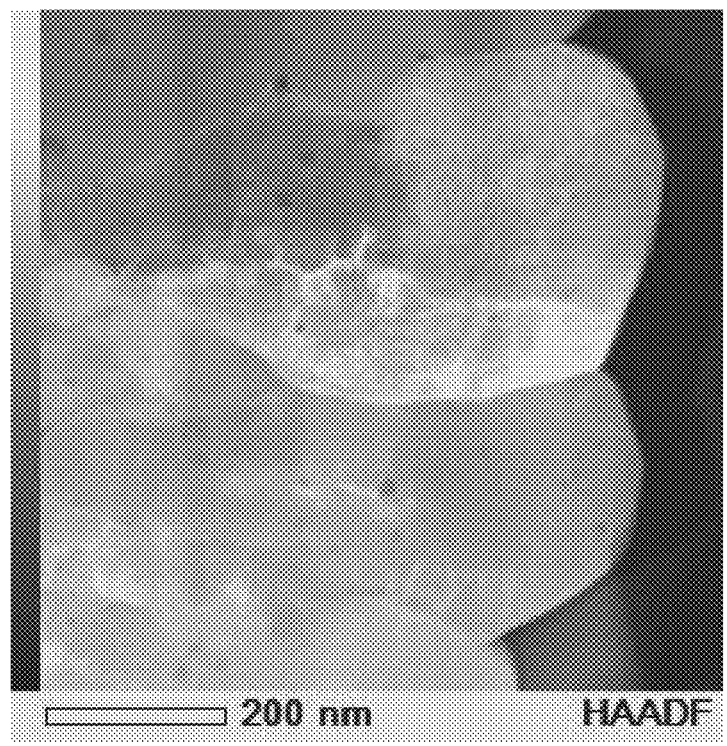
FIG. 5 is a HAADF image of Comparative Example 1.
Figure 6:
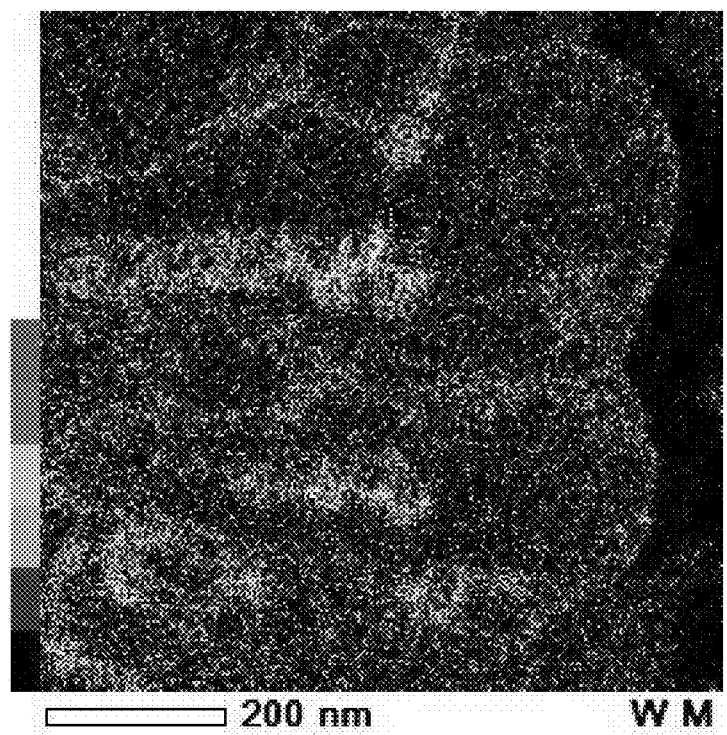
FIG. 6 is a TEM-EDX image of Comparative Example 1.

FIG. 5 is a HAADF image of the cathode active material of Comparative Example 1. FIG. 6 is a TEM-EDX image of the cathode active material of Comparative Example 1. Table 4 shows the element composition ratios obtained by TEM-EDX analysis of the cathode active material of Comparative Example 1.

TABLE 4

| | Position | Ni (at %) | Co (at %) | Mn (at %) | W (at %) |
|---|---|---|---|---|---|
| Comparative Example 1 | 1 Grain boundary | 32 | 28 | 34 | 5.3 |
| | 2 Inside | 31 | 34 | 34 | 0.4 |
| | 3 Inside | 40 | 18 | 21 | 21.1 |
| | 4 Inside | 38 | 24 | 29 | 9.0 |
| | 5 Inside | 36 | 22 | 26 | 15.1 |
| | 6 Inside | 36 | 24 | 25 | 14.6 |
| | 7 Grain boundary | 32 | 34 | 31 | 3.5 |
| | 8 Inside | 36 | 34 | 29 | 0.3 |
| | Element concentration standard deviation σ | 2.9 | 5.9 | 4.2 | 7.1 |
| | Element concentration average t (%) | 33.4 | 32.8 | 32.8 | 1.00 |
| | σ/t | 0.088 | 0.18 | 0.13 | 7.16 |

Comparative Example 2

A battery was produced in the same manner as Example 1, except that such a cathode active material ($Li_{1.14}Ni_{0.336}Co_{0.331}Mn_{0.328}W_{0.005}O_2$) that the W element distribution was non-uniform, was used as the cathode active material.

Table 5 shows the element composition ratios obtained by TEM-EDX analysis of the cathode active material of Comparative Example 2.

TABLE 5

| | Position | Ni (at %) | Co (at %) | Mn (at %) | W (at %) |
|---|---|---|---|---|---|
| Comparative Example 2 | 1 Grain boundary | 33 | 29 | 30 | 8.1 |
| | 2 Inside | 34 | 34 | 29 | 3.6 |
| | 3 Inside | 35 | 28 | 26 | 11.1 |
| | 4 Inside | 37 | 36 | 26 | 0.5 |
| | Element concentration standard deviation σ | 1.8 | 3.2 | 1.6 | 4.1 |
| | Element concentration average t (%) | 33.6 | 33.1 | 32.8 | 0.50 |
| | σ/t | 0.052 | 0.097 | 0.049 | 8.21 |

Comparative Example 3

A battery was produced in the same manner as Example 1, except that such a cathode active material ($Li_{1.14}Ni_{0.336}Co_{0.331}Mn_{0.328}W_{0.005}O_2$) that the W element distribution was non-uniform, was used as the cathode active material, and a complex solution of $LiNbO_3$ was used as the cathode active material coating solution.

Table 6 shows the element composition ratios obtained by TEM-EDX analysis of the cathode active material of Comparative Example 3.

TABLE 6

| | Position | Ni (at %) | Co (at %) | Mn (at %) | W (at %) |
|---|---|---|---|---|---|
| Comparative Example 3 | 1 Grain boundary | 33 | 29 | 30 | 8.1 |
| | 2 Inside | 34 | 34 | 29 | 3.6 |
| | 3 Inside | 35 | 28 | 26 | 11.1 |
| | 4 Inside | 37 | 36 | 26 | 0.5 |
| | Element concentration standard deviation σ | 1.8 | 3.2 | 1.6 | 4.1 |
| | Element concentration average t (%) | 33.6 | 33.1 | 32.8 | 0.50 |
| | σ/t | 0.052 | 0.097 | 0.049 | 8.21 |

(Charge-Discharge Test)

The batteries of Examples 1 to 3 and Comparative Examples 1 to 3 were subjected to a charge-discharge test. In particular, for each battery, the initial capacity was obtained by carrying out constant current-constant voltage (CCCV) charge and discharge in a state of charge (SOC) of 0 to 100%, in the condition of an ambient temperature of 25° C. and a current of ⅓ C. After the SOC was controlled to 40%, constant current discharge was carried out at a current rate of 7 C (ΔI). From a voltage decrease (ΔV) 5 seconds after the discharge, the initial resistance of the battery was obtained.

Then, 1000 cycles of charge and discharge in a state of charge (SOC) of 10 to 90%, were carried out in the condition of an ambient temperature of 60° C. and a current of 2 C.

Then, constant current (CC) charge was carried out in the condition of an ambient temperature of 60° C. and a current of 2 C, and the capacity and resistance after the 1000 cycles were obtained.

From the capacity after the 1000 cycles and the initial capacity, the capacity retention rate was calculated. Table 7 shows the results of Examples 1 and 2 and Comparative Examples 1 and 2. Table 8 shows the results of Example 3 and Comparative Example 3.

From the resistance after the 1000 cycles and the initial resistance, the resistance increase rate was calculated. Table 7 shows the results of Examples 1 and 2 and Comparative Examples 1 and 2. Table 8 shows the results of Example 3 and Comparative Example 3.

The capacity retention rates and resistance increase rates of Examples 1 and 2 and Comparative Example 2 in Table 7, are equivalent values when the capacity retention rate and resistance increase rate of Comparative Example 1 were each determined as 100. The capacity retention rate and resistance increase rate of Example 3 in Table 8 are equivalent values when the capacity retention rate and resistance increase rate of Comparative Example 3 were each determined as 100.

TABLE 7

|  | W distribution | Added W amount (mol %) | Capacity retention rate (%) | Resistance increase rate (%) |
| --- | --- | --- | --- | --- |
| Example 1 | Uniform | 1 | 109 | 88 |
| Example 2 | Uniform | 0.5 | 108 | 93 |
| Comparative Example 1 | Non-uniform | 1 | 100 | 100 |
| Comparative Example 2 | Non-uniform | 0.5 | 103 | 99 |

TABLE 8

|  | W distribution | Added W amount (mol %) | Capacity retention rate (%) | Resistance increase rate (%) |
| --- | --- | --- | --- | --- |
| Example 3 | Uniform | 0.5 | 105 | 94 |
| Comparative Example 3 | Non-uniform | 0.5 | 100 | 100 |

As is clear from Table 7, the capacity retention rates of Examples 1 and 2 are 8 to 9% higher than Comparative Example 1, and the resistance increase rates of Examples 1 and 2 are 7 to 12% lower than Comparative Example 1.

As is clear from Table 8, the capacity retention rate of Example 3 is 5% higher than Comparative Example 3, and the resistance increase rate of Example 3 is 6% lower than Comparative Example 3.

Therefore, it is clear that compared to the cathode active materials of Comparative Examples 1 to 3, the cathode active materials of Examples 1 to 3 can increase the durability of a battery and can decrease the resistance increase rate of the same.

A comparison between the cathode active material of Example 1 (FIGS. 2 and 3) and that of Comparative Example 1 (FIGS. 5 and 6) shows that while the segregation of the W element is found at the grain boundaries and in the insides of the primary particles in Comparative Example 1, the W element distribution is uniform in Example 1. This is also clear from the fact that the values of σ/t (the element concentration standard deviation σ/the element concentration average t) of Example 1 shown in Table 1, are smaller than those of Comparative Example 1 shown in Table 4. This difference is considered to contribute to increasing the capacity retention rate of a battery and decreasing the resistance increase rate of the same.

Therefore, from Examples 1 to 3, it is clear that if the value of σ/t (the element concentration standard deviation σ/the element concentration average t) is at least 0.92 or less, the capacity retention rate of a battery after the 1000 cycles can be increased, and the resistance increase rate of the same after the 1000 cycles can be decreased. This is supposed to be because, since the W element distribution is uniform, the W element in the cathode active material uniformly and strongly attracts O atoms in the cathode active material, and the uniform and strong attraction contributes to preventing deterioration of the cathode active material in a high potential environment.

As is clear from Tables 1 to 3, if the variation in the distribution of the W element at the grain boundaries and in the insides of the primary particles is small like the cathode active materials of Examples 1 to 3, the variation in the composition of the transition metals (Ni, Co, Mn) constituting the cathode active material is also small.

Meanwhile, as is clear from Tables 4 to 6, if the W element is, like the cathode active material of Comparative Examples 1 to 3, concentrated at the grain boundaries and in the insides of the primary particles, there is a variation in the composition ratio of the transition metal elements.

Therefore, it is considered that since the distribution of the transition metal elements in the cathode active material is uniform (the variation in the distribution is small), the cathode active material is prevented from local deterioration and leads to high durability performance of a battery.

The invention claimed is:

1. A cathode active material represented by a general formula $Li_{(1+a)}Ni_xCo_yMn_zW_tO_2$, wherein $-0.05 \leq a \leq 0.2$, $x=1-y-z-t$, $0 \leq y < 1$, $0 \leq z < 1$, and $0 < t \leq 0.03$, wherein the cathode active material satisfies the following formula (1):

$$\sigma 1/t1 \leq 0.30 \quad (1)$$

where t1 is an element concentration average of insides and grain boundaries of primary particles of a W element, and σ1 is an element concentration standard deviation of the insides and grain boundaries of the primary particles of the W element, the element concentration being calculated by transmission electron microscope-energy dispersive x-ray spectroscopy analysis, and wherein an average particle diameter of the primary particles is in a range of from 0.1 to 2.0 μm.

2. The cathode active material according to claim 1, wherein the cathode active material satisfies at least one of the following formulae (2) to (4):

$$\sigma 2/t2 \leq 0.10 \quad (2)$$

$$\sigma 3/t3 \leq 0.10 \quad (3)$$

$$\sigma 4/t4 \leq 0.10 \quad (4)$$

where t2 is an element concentration average of insides and grain boundaries of primary particles of a Ni element; t3 is an element concentration average of insides and grain boundaries of primary particles of a Co element; t4 is an element concentration average of insides and grain boundaries of primary particles of a Mn element; σ2 is an element concentration standard deviation of the insides and grain boundaries of the primary particles of the Ni element; σ3 is an element concentration standard deviation of the insides and grain boundaries of the primary particles of the Co element; and σ4 is an element concentration standard deviation of the insides and grain boundaries of the primary particles of the Mn element.

3. The cathode active material according to claim 2, wherein the cathode active material satisfies all of the following formulae (5) to (7):

$$\sigma 2/t2 \leq 0.07 \quad (5)$$

$$\sigma 3/t3 \leq 0.07 \quad (6)$$

$$\sigma 4/t4 \leq 0.07 \quad (7).$$

4. A lithium ion secondary battery comprising: a cathode comprising a cathode active material layer comprising the cathode active material defined by claim 1, an anode comprising an anode active material layer comprising an anode active material, and an electrolyte layer disposed between the cathode and the anode.

* * * * *